United States Patent
Oberti

(10) Patent No.: US 6,279,698 B1
(45) Date of Patent: Aug. 28, 2001

(54) HIGH EFFICIENCY BRAKING AND SELF-DRAINING BRAKE-DISK WITH VISUAL WEAR CONTROL

(75) Inventor: Leone Oberti, Lenna (IT)

(73) Assignee: Brembo S.p.A., Curno (IT)

( * ) Notice: Subject to any disclaimer, the term of this patent is extended or adjusted under 35 U.S.C. 154(b) by 0 days.

(21) Appl. No.: 09/374,518

(22) Filed: Aug. 16, 1999

(30) Foreign Application Priority Data

Sep. 11, 1998 (EP) .................................................. 98830533

(51) Int. Cl.$^7$ ............................. F16D 65/12; F16D 66/02
(52) U.S. Cl. ............................ 188/218 XL; 188/1.11 W; 188/73.2
(58) Field of Search ........................... 188/218 XL, 73.2, 188/264 A, 264 AA, 261, 264 B, 250 E, 250 G, 71.1, 1.11 R, 1.11 W; 192/113.22, 113.26, 113.23, 113.36, 70.12, 70.14, 107 R

(56) References Cited

U.S. PATENT DOCUMENTS

| | | | | |
|---|---|---|---|---|
| 4,260,047 | * | 4/1981 | Nels | 192/107 R |
| 4,286,694 | * | 9/1981 | Wiseman, Jr. et al. | 188/281 XL |
| 4,396,100 | * | 8/1983 | Eltze . | |
| 4,913,267 | * | 4/1990 | Campbell et al. | 188/218 XL |
| 5,358,086 | * | 10/1994 | Muller et al. | 188/218 XL |
| 5,480,007 | * | 1/1996 | Hartford | 188/218 XL |
| 5,566,802 | * | 10/1996 | Kirkwood . | |
| 5,662,192 | * | 9/1997 | Kingston et al. | 188/218 XL |
| 5,735,366 | * | 4/1998 | Suga et al. | 188/218 XL |
| 6,186,293 | * | 2/2001 | Beer et al. | 188/218 XL |

FOREIGN PATENT DOCUMENTS

| | | | |
|---|---|---|---|
| 2308256 | | 9/1974 | (DE) . |
| 2458048 | * | 6/1976 | (DE) . |
| 3410127 | * | 10/1985 | (DE) . |
| 3432926 | * | 3/1986 | (DE) . |
| 4002695 | * | 8/1991 | (DE) . |
| 29519929 | | 2/1996 | (DE) . |
| 19512934 | | 10/1996 | (DE) . |
| 29704133 | | 8/1998 | (DE) . |
| 19824465 | * | 12/1999 | (DE) . |
| 19824971 | * | 12/1999 | (DE) . |
| 0128758 | * | 12/1984 | (EP) . |
| 0364620 | | 4/1990 | (EP) . |
| 0902209 | * | 3/1999 | (EP) . |
| 0985841 | * | 3/2000 | (EP) . |
| 0985845 | * | 3/2000 | (EP) . |
| 1048873 | * | 11/2000 | (EP) . |
| 1309093 | | 2/1963 | (FR) . |
| 1340925 | | 1/1964 | (FR) . |
| 58-37330 | * | 3/1983 | (JP) . |
| 58-037331 | | 3/1983 | (JP) . |
| 59-113992 | | 6/1984 | (JP) . |
| 60-37432 | * | 2/1985 | (JP) . |
| 62-297549 | * | 12/1987 | (JP) . |
| 8-93809 | * | 4/1996 | (JP) . |
| 1073136 | * | 3/1998 | (JP) . |
| 88018 | * | 3/2000 | (JP) . |
| 97265 | * | 4/2000 | (JP) . |
| 97266 | * | 4/2000 | (JP) . |
| 9607034 | * | 3/1996 | (WO) . |
| 9743559 | * | 11/1997 | (WO) . |

* cited by examiner

Primary Examiner—Douglas C. Butler
(74) Attorney, Agent, or Firm—Bucknam and Archer

(57) ABSTRACT

A high braking efficiency and self-draining brake disc with wear visual control comprises a braking strip (2) having two opposite faces (2', 2") provided each with a swept braking surface, a bell (3) fixed to the axis of a wheel and a connection throat (4) between the braking strip (2) and the bell (3), wherein at least a face, preferably both faces (2', 2"), of the braking strip (2) is provided with radial grooves (5) shaped as a circle arc, opened towards the outside of the braking strip (2) and communicating with the connection throat (4); the radial grooves (5) being extended on all the swept braking surface.

12 Claims, 2 Drawing Sheets

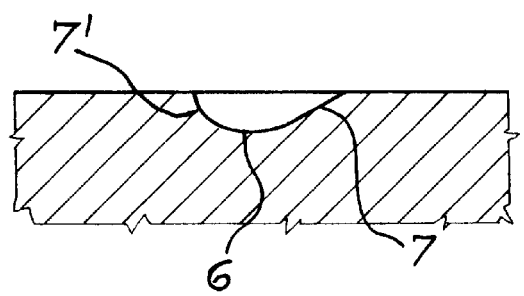
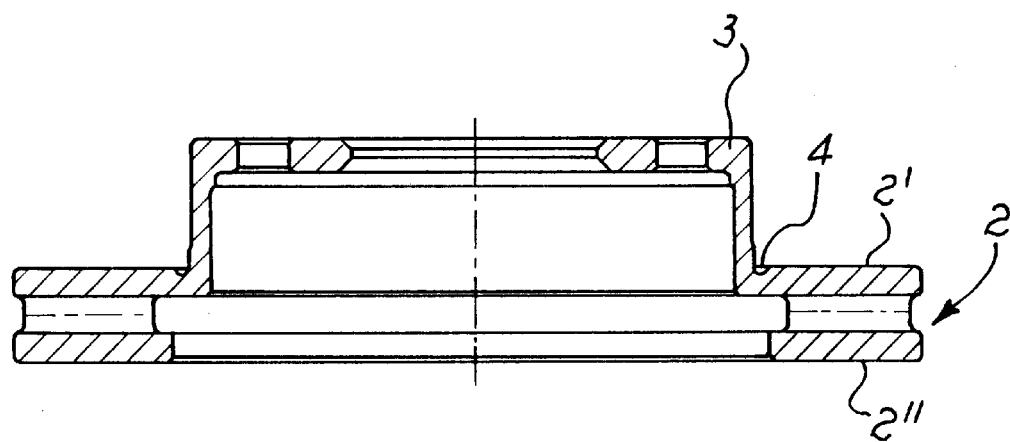

HIGH EFFICIENCY BRAKING AND SELF-DRAINING BRAKE-DISK WITH VISUAL WEAR CONTROL

DESCRIPTION

The present invention relates to a high braking efficiency and self-draining brake disc with wear visual control. More particularly, the present invention relates to a high braking efficiency and self-draining brake disc with wear visual control especially suitable for use in disc braking devices.

As is known, braking devices are units able to slow or stop a vehicle or, in general, a moving mass, by transforming the absorbed kinetic energy into thermal energy.

A type of braking device used in motorcars has a disc constituted by a metal brake disc, fixed to the wheel axis, astride of which pliers act that are fixed to the articulated stub axle or the hub-bearer of the vehicle and provided with braking gaskets, generally known as "brake pads". The brake disc comprises a braking strip, provided with a swept braking surface on both faces, and a bell or hub fixed to the wheel axis.

The pliers, activated by suitable means, push the brake pads against each swept surface of the braking strip. The braking action is therefore produced by the friction between the brake pads and the swept surface of the braking strip of the brake disc. The braking torque depends therefore on the geometry of the device, in particular on the radial position of the brake pads, the thrust exercised by the activation means and the wear coefficient between the braking surfaces of the brake disc and the brake pads.

In conditions of coupling between the surfaces of the brake disc and the brake pads transformed by effect of the interposition between these of a water veil due to atmospheric moist conditions, such as fog, frost, rains, etc. on wet grounds, there happens the known undesired phenomena of reduction of the braking torque. In such conditions, in fact, the friction coefficient between the brake pad and the brake disc drops, as, in spite of the suitable protections, the water reaches the brake disc, wedging into the zone of contact with the brake pads, wetting them. One observes therefore a starting decrease in the friction coefficient and, consequently, of the braking torque, due to the simple fact that the contact is wet.

In order to increase the reliability on wet grounds, it has been proposed to provide the surfaces of the brake disc with grooves either continuous or closed at the end, so as to create structural irregularities on the gasket-metal contact surface. This type of brake disc, functional though it is, does not allow to solve satisfactorily the problem of the wet contact, as grooves, being closed, do not permit to obtain the complete expulsion of water in the brake pad-disc zone.

To solve the problem of the wet contact, it has been proposed to provide the braking surfaces of the brake disc looking towards the braking gaskets, with radial grooves, open towards the outside and curved with a progressive curve, whose radius decreases towards the greater diameters of the disc.

These grooves solve the drawback of the wet contact entirely, as they allow to obtain the complete expulsion of water from the brake pad-disc contact zone, but their profile is complicated and their realisation require specific and complicated tools, and consequently they affect remarkably the cost of the end product. Object of this invention is to obviate the aforementioned drawbacks of the brake discs of the known art.

More particularly, object of this invention is to provide a brake disc such as to allow an easy and complete removal of the water veil from its braking surfaces and such as to be perfectly balanced and of easy and economical realisation.

From its more general aspect, the present invention allows to achieve these and other objects, which will appear from the following description, by providing at least one and possibly both faces of the brake disc, in correspondence of the braking strip looking towards the brake pad, with circle-arc-shaped radial grooves opened towards the outside and communicating with the throat or connection channel between the brake disc and the bell. Object of this invention is therefore a high braking efficiency and self-draining brake disc, suitable for use in disc braking devices, comprising a braking strip having two opposite faces provided each with a swept braking surface, a bell fixed to the axis of a wheel, and a connection throat between said braking strip and said bell, wherein at least one and possibly both faces of the brake disc are provided with circle-arc-shaped radial grooves open towards the outside and communicating with said throat; said radial grooves being extended on the whole swept braking surface.

The grooves have the same pitch and the radial dimension of each groove is at least equal to, or preferably greater than, that of the braking gaskets.

According to a preferred embodiment, the radial grooves are provided on both opposing faces of the braking strip, have the same pitch and those located on one face are offset of a half-pitch with respect to the grooves located on the opposite face of the same braking strip.

In this way, the grooves communicate with the connection throat in different zones of said ring and alternate on each face. Besides, this arrangement of the grooves allows to have always at least a brake pad covering at least one of said grooves and, at the same time, the grooves are never covered simultaneously by the brake pads.

Preferably, the radial grooves have a cross-section constituted by a central length shaped as a circle arc and by two opposite rectilinear lengths connecting said circumference arc with the external surface of the disc, with a common tangent in the passage point. Of said rectilinear lengths, the front one, with respect to the rotation of the disc, is inclined, while the back one forms an incidence angle with the braking surface of the disc such as to prevent water leakage.

In the rotation direction of the disc and the ensuing relative movement between brake pads and disc, the rectilinear front length precedes the circumference arc and therefore gets first in touch with the brake pad. Therefore, water is collected in the circumference arc and expelled by centrifugal force.

The grooves shaped as mentioned above hinder the formation of the water veil when braking on wet grounds, both because they interrupt the continuity of the surfaces in touch and because their opening towards the outside facilitates the removal of water present on the braking surface of the disc.

The cross-section of the grooves eases the collection of water brought by the relative movement of the brake pads with respect to the brake disc, while the orientation of the channel exercise a water pumping action towards the outside of the disc, so as to obtain a turbine action.

The particular conformation of the grooves also causes the surface of the brake pads to be constantly restored as, at each passage of the same on a groove, the back length of each grooves gets gradually in touch with the brake pad and restores it active surface.

By adjusting the depth of said radial grooves so that it is not greater than the maximum wear level on each face of the brake disc indicated by the manufacturer, said radial grooves act also as wear visual control means. When, in fact, the grooves have a very reduced depth, this means that the disc is worn and must be controlled with more frequency, and when the grooves disappear or are just visible, the brake disc has reached its maximum wear limit and must be replaced.

Preferably, at least one of said radial grooves has a prefixed depth hollow than the other ones, so that its disappearance points out the imminent complete wear of the disc.

The particular arc of circumference shape of radial grooves allows to obtain them easily by means of a circular hollow milling cutter with a shaped tool.

The construction and functional characteristics of the brake disc of the present invention will be better understood thanks to the following description wherein reference is made to the attached drawings which show a preferred embodiment, by way of non limiting example, and wherein:

FIG. 3 shows an enlarged schematic view of a section normal to the groove axis of the groove of FIG. 2, seen from the Y direction, wherein the cross-section of said groove can be seen; and FIG. 4 shows a schematic view of a section of the brake disc obtained according to a plane passing along line A—A of FIG. 1.

Figure 1:
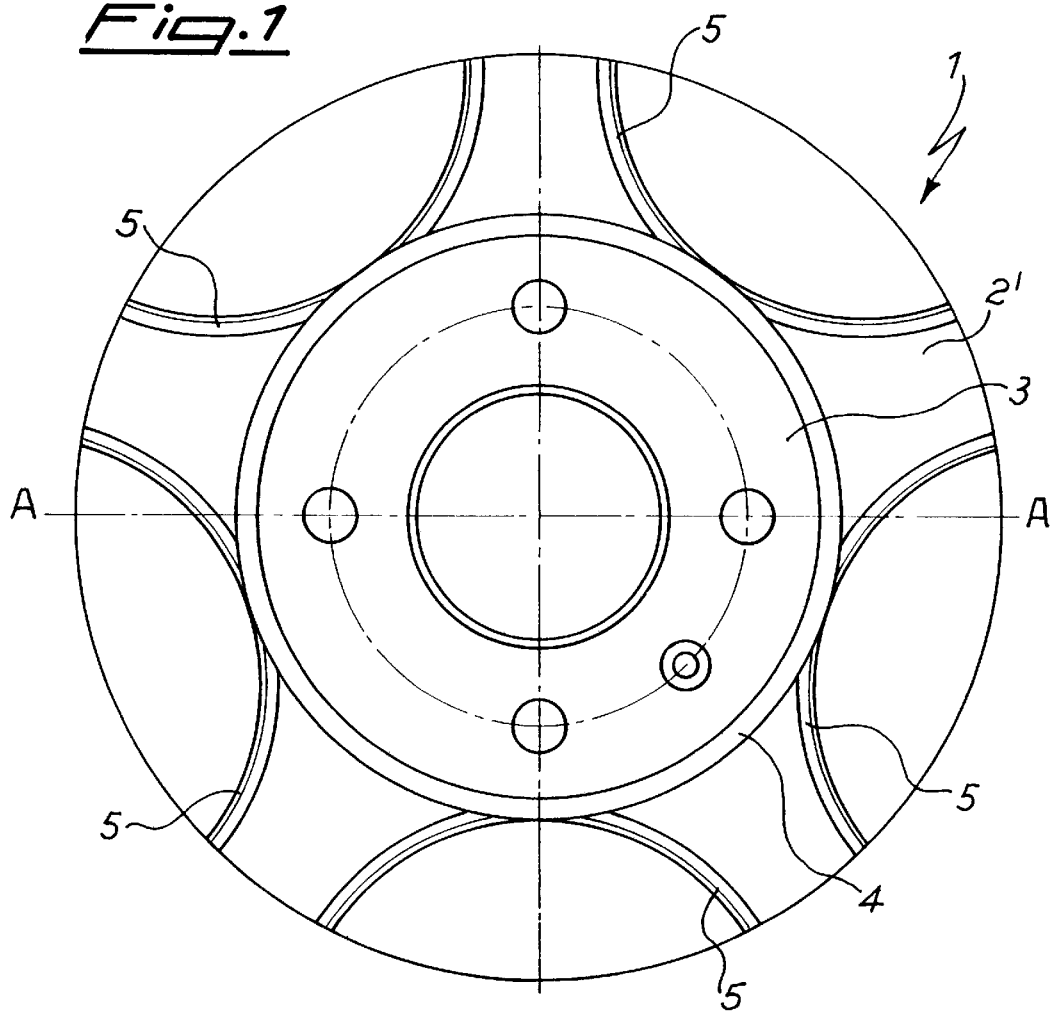
FIG. 1 shows a schematic front view of the brake disc of the present invention.
Figure 2:
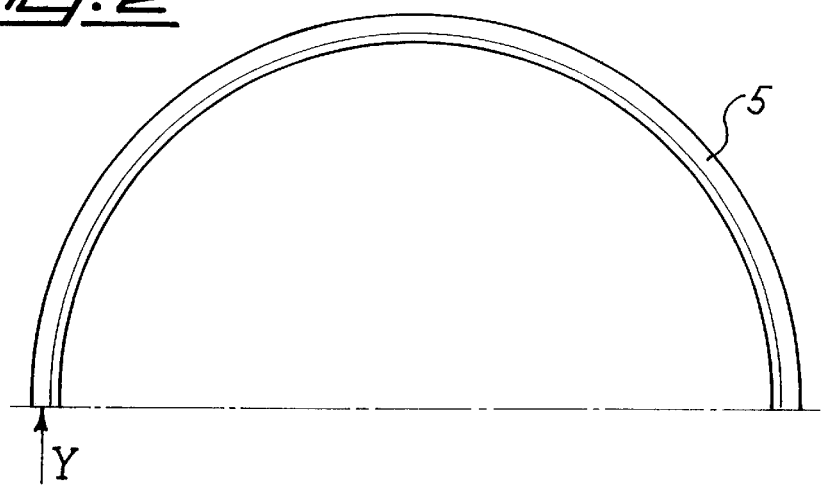
FIG. 2 shows an enlarged schematic view of a circle-arc-shaped groove, which each face is provided with, in correspondence of the swept braking surface.

The present description is made with reference to a brake disc of the self-ventilated type, even is the present invention may be applied with the same success to any other type of brake disc, for instance of the solid type.

With special reference to the figures, the brake disc 1 of the present invention comprises a braking strip 2, a bell 3 fixed to the axis of a wheel (not shown), and a connection throat 4 between said braking strip 2 and said bell 3.

The braking strip 2 has two opposite faces 2' and 2", provided with a swept braking surface on which the brake pads act during the braking.

Each face 2' and 2" of the braking strip 2 is provided with radial grooves 5, arranged at a same distance from one another, in correspondence of the swept braking surface designed to get in touch with the braking gaskets.

The number of grooves 5 is not critical for the purposes of this invention, but generally they are at least 2 and generally 4 to 10 on each face 2', 2" of the braking strip 2.

Said grooves 5 are opened towards the outside of the braking strip 2 at the free ends and communicate with said connection throat 4 in the part looking towards the inside of the braking disc 1.

Grooves 5 are arc-of-circle-shaped and their size is such as to connect the connection ring 4 with the outside of the brake disc. Grooves 25 of both faces 2', 2" of the braking strip 2 have the same pitch and the grooves of a face are offset by half-pitch with respect to the grooves of the opposite face of the same braking strip.

As can be see in FIG. 3, the cross-section of each groove 5 has a central part shaped as an arc of circumference 6 and two rectilinear opposite side lengths 7 and 7' connecting said central part shaped as a circumference arc 6 and the external surface of the disc, with a common tangent in the passage point.

The front rectilinear length 7 which, during the rotation of the brake disc 1, gets first in touch with the braking gasket is inclined to facilitate the entering of water pushed by said gasket, while the back rectilinear length 7' forms an incidence angle, for instance of about 90°, with the surface of the brake disc 1 such as to prevent water from flowing out.

In the rotation of the brake disc 1 and the ensuing relative movement between the brake pad and the brake disc, the rectilinear front length 7 precedes the circumference arc 6 and therefore gets first in touch with the brake pad. Water is pushed by the brake pad in the central circumference-arc-shaped length 6 of grooves 5. The shape of the cross-section 5 is such that the rectilinear front length 7 eases the entering of water, while the rectilinear back length 7', which forms a substantially right angle and a sharp edge with the braking surface of the brake disc 1, prevents the leakage.

Water expulsion is caused by the formation of a closed-section channel between the central length 6 of groove 5 and the brake gasket, opened towards the external periphery of the disc. The water collected in said channel is therefore pumped towards the outside and then expelled in the same way as happens in a rotary centrifuge.

Besides, grooves 5 allow a visual control of the braking surfaces of the brake disc and have therefore also the function of a visual indicator of the wear of said brake disc. In such case, the depth of the radial grooves 5 is not greater than the maximum wear level allowed on each face of the brake disc, indicated by the manufacturer. In this way, when the grooves have a very reduced depth, this means that the brake disc is worn and must be controlled more frequently, and when the grooves disappear or are just visible, the brake disc has reached its maximum wear limit and must be replaced. One of the radial grooves 5 may have a depth of about 0.1–0.3 mm hollower than the other ones, so as to act as an indication of the imminent complete wear of the disc. Even though the present invention has been described with reference to a preferred embodiment of the same, various changes and variants may be made in the brake disc of the present invention, in the light of the above teaching. It is therefore understood that the present invention comprises all the changes and variants that fall within the spirit and the protection scope of the appended claims.

What is claimed is:

1. A high braking efficiency and self-draining brake disc (1), adapted for use in disc-braking devices, comprising a braking strip (2) having two opposing faces (2',2"), each being provided with a swept braking surface, a bell (3) fixed to the axis of a wheel and a connection throat (4) between said braking strip (2) and said bell (3), wherein radial grooves (5) shaped in the arc of a circle are arranged on said opposing faces (2',2") of said braking strip (2), said grooves arranged on one face of said opposing faces of said braking strip are offset by-a half-pitch with respect to the grooves arranged on the opposing face, said grooves extending on all the swept braking surface and being open towards the outside of said braking strip and communicating with said throat.

2. The brake disc according to claim 1, wherein all grooves (5) have the same pitch.

3. The brake disc according to claim 1, wherein grooves (5) connect the connection throat (4) with the outside of the brake disc.

4. The brake disc according to claim 1, wherein grooves (5) have a cross-section provided with a central length shaped as a circumference arc (6) and two rectilinear opposite lengths (7, 7') connecting said central length shaped as a circumference arc (6) with the external surface of the disc, with a common tangent in the passage point.

5. The brake disc according to claim 4, wherein the rectilinear front length (7) which, during the rotation of the brake disc (1) gets in touch first with a braking gasket, is inclined to ease the entering of water pushed by the gasket and the rectilinear back length (7'), forms an incidence angle with the surface of the brake disc (1) such as to prevent water leakage.

6. The brake disc according to claim 5, wherein the incidence angle between the rectilinear back length (7') and the surface of the brake disc (1) is of about 90°.

7. The brake disc according to claim 1, wherein the depth of grooves (5) is not greater than the maximum wear level allowed on each face of the brake disc.

8. The brake disc according to claim 7, wherein each of grooves (5) has a depth hollower by about 0.1–0.3 mm than that of the other grooves (5).

9. The brake disc according to claim 1, wherein there are at least two grooves (5) on each of said opposing faces (2',2") of said braking strip (2).

10. The brake disc according to claim 1, wherein there are between 4 and 10 grooves (5) on each of said opposing faces (2',2") of said braking strip (2).

11. The brake disc according to claim 1, wherein the radial dimension of each groove (5) is at least equal to that of the braking gaskets.

12. The brake disc according to claim 1, wherein the radial dimension of each groove (5) is greater than that of the braking gaskets.

* * * * *